(No Model.)

W. C. NICHOLS.
BICYCLE.

No. 536,647. Patented Apr. 2, 1895.

Witnesses
Chas. F. Ford

By his Attorneys,

Inventor
William C. Nichols,
C. A. Snow & Co.

UNITED STATES PATENT OFFICE.

WILLIAM C. NICHOLS, OF WILLIAMSPORT, PENNSYLVANIA, ASSIGNOR OF ONE-HALF TO CHARLES E. BROWNELL, OF SAME PLACE.

BICYCLE.

SPECIFICATION forming part of Letters Patent No. 536,647, dated April 2, 1895.

Application filed June 27, 1894. Serial No. 515,860. (No model.)

*To all whom it may concern:*

Be it known that I, WILLIAM C. NICHOLS, a citizen of the United States, residing at Williamsport, in the county of Lycoming and State of Pennsylvania, have invented a new and useful Bicycle, of which the following is a specification.

My invention relates to bicycles, and particularly to speed or multiple-gearing for the same; and the objects in view are to provide simple, direct, and efficient means for communicating motion from the crank-shaft of a bicycle or other velocipede to the driving-wheel; to provide improved means whereby said mechanism may be attached to the frame of a bicycle of the ordinary construction; and, furthermore, to provide improved means for adjustment of the parts of the mechanism, whereby looseness of the chains due to wear, changes of temperature, &c., may be taken up.

Further objects and advantages of the invention will appear in the following description, and the novel features thereof will be particularly pointed out in the appended claim.

Figure 1:
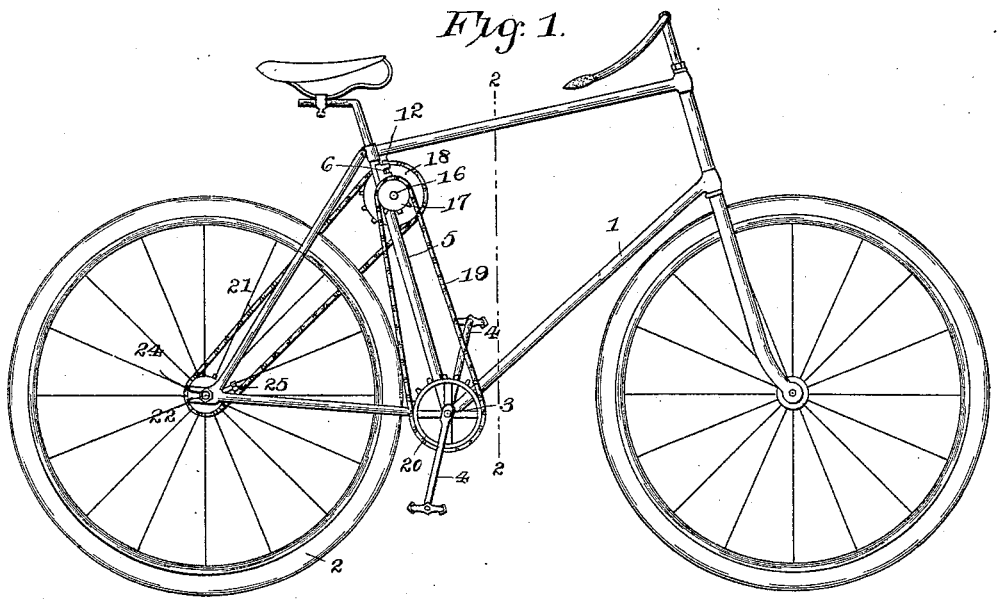
Figure 3:
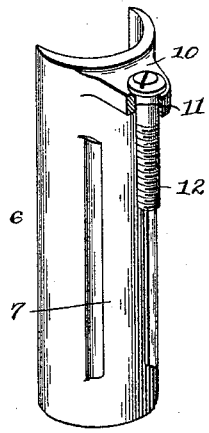
Figure 2:
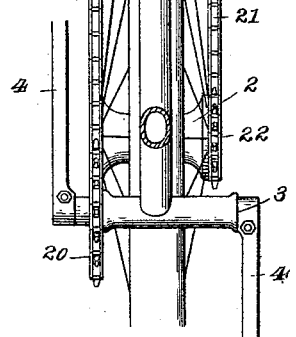
Figure 4:
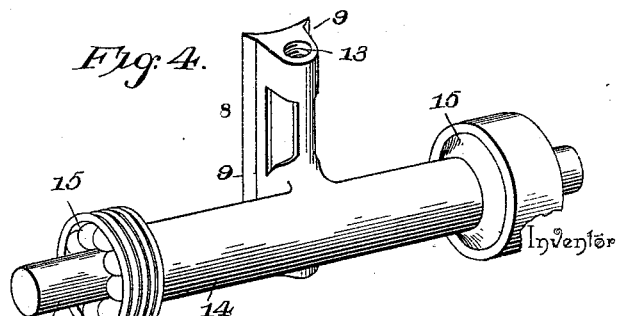

In the drawings:—Figure 1 is a view of a bicycle provided with driving mechanism embodying my invention. Fig. 2 is a front view of the driving mechanism, the framework of the machine being shown in section on the line 2—2 of Fig. 1. Fig. 3 is a detail view of a guide-plate for attachment to one of the braces of the bicycle framework. Fig. 4 is a detail view of the slide which carries the bearings for the countershaft.

Similar numerals of reference indicate corresponding parts in all the figures of the drawings.

1 designates the framework of a bicycle; 2, a driving-wheel; 3, a crank-shaft having the pedal cranks 4, and 5 a brace forming a part of said bicycle framework. Attached to the brace 5, above the plane of the shaft of the driving-wheel, is a guide-plate 6, provided at its front side with a guide-way 7, consisting of parallel under-cut flanges, and 8 represents a slide mounted upon said guide-plate and having lateral beveled ribs 9 to engage the under-cut surfaces of the parallel flanges forming the way 7. The guide-plate is provided at its upper end with a forwardly projecting ear 10 having a smooth opening 11, in which is mounted an adjusting-bolt 12, and the lower end of said bolt is threaded in a perforation 13 in the upper end of the slide 8. This slide carries a sleeve 14 provided with terminal bearings 15, which are preferably constructed with anti-friction balls or rollers, and in said terminal bearings is mounted the countershaft 16, provided at one end with a small chain-wheel 17 and at the other end with a larger chain-wheel 18. The small chain-wheel 17 is connected by means of a chain 19 with a chain-wheel 20 fixed to the crank-shaft, as in the ordinary construction, and the larger chain-wheel 18 is connected by means of a small chain 21 with a chain-wheel 22 fixed to the hub of the driving-wheel. The relative sizes of the several chain-wheels cause a rotation of the countershaft at a higher rate of speed than the crank-shaft and a rotation of the driving-wheel at a higher rate of speed than the countershaft, and it will be obvious that the relative rates of speed of the crank-shaft and the driving-wheel may be varied, as desired, by a suitable regulation of the relative sizes of the several chain-wheels.

The shaft 23 of the driving-wheel is arranged in horizontal slots 24 in the framework of the machine, and is adjustable in a horizontal plane to vary the tension of the chain 21 by means of an adjusting-bolt 25, and by means of the bolt 12 the slide 8 may be adjusted parallel with the length of the chain 19 to vary the tension of said chain, and thus secure the accurate co-operation of the parts of the mechanism.

It will be understood that in practice various changes in the form, proportion, and the minor details of construction may be resorted to without departing from the spirit of the invention or sacrificing any of the advantages thereof.

Having described my invention, what I claim is—

The combination with a framework, a driving-wheel, and a crank-shaft, of a guide-plate fixed to the framework, provided at its upper end with an ear having a smooth opening, and below the same with a guide-way consisting of opposite parallel under-cut flanges, a slide having lateral beveled ribs engaging said under-cut flanges and also provided at its upper end with a threaded opening, an adjusting-bolt loosely mounted in the opening in the ear of the guide-plate and threaded in said opening of the slide, a sleeve carried by the slide and having terminal bearings, a counter-shaft mounted in said bearings, and connections between the counter-shaft and the crank-shaft and driving-wheel, substantially as specified.

In testimony that I claim the foregoing as my own I have hereto affixed my signature in the presence of two witnesses.

WILLIAM C. NICHOLS.

Witnesses:
W. E. RITTER,
W. H. SPENCER.